United States Patent
Li et al.

(10) Patent No.: US 7,134,766 B2
(45) Date of Patent: Nov. 14, 2006

(54) LENS-ARRAYED BACKLIGHT MODULE AND LIQUID CRYSTAL DISPLAY DEVICE

(75) Inventors: Szu-Han Li, Gueishan Township, Taoyuan County (TW); Yi-Chen Kuo, Gueishan Township, Taoyuan County (TW); Hui-Ju Hsu, Gueishan Township, Taoyuan County (TW); Chun-Chung Hsiao, Gueishan Township, Taoyuan County (TW); Chun-Chien Chu, Gueishan Township, Taoyuan County (TW)

(73) Assignee: Quanta Display Inc., Tao Yuan Shien (TW)

( * ) Notice: Subject to any disclaimer, the term of this patent is extended or adjusted under 35 U.S.C. 154(b) by 109 days.

(21) Appl. No.: 10/870,969

(22) Filed: Jun. 21, 2004

(65) Prior Publication Data

US 2005/0248939 A1 Nov. 10, 2005

(30) Foreign Application Priority Data

May 5, 2004 (TW) ............................... 93112643 A

(51) Int. Cl.
*F21S 4/00* (2006.01)

(52) U.S. Cl. ...................... 362/225; 362/235; 362/600; 362/608; 362/614

(58) Field of Classification Search ................ 362/225, 362/235, 600, 608, 614, 613, 632, 633, 634
See application file for complete search history.

(56) References Cited

U.S. PATENT DOCUMENTS

| 6,331,063 B1* | 12/2001 | Kamada et al. ............. 362/237 |
| 6,880,953 B1* | 4/2005 | Shin ........................... 362/225 |
| 2002/0003706 A1* | 1/2002 | Dealey et al. .............. 362/478 |
| 2002/0136001 A1* | 9/2002 | Lefkovitz et al. ........... 362/147 |
| 2003/0007359 A1* | 1/2003 | Sugawara et al. .......... 362/326 |
| 2004/0141104 A1* | 7/2004 | Yu et al. ...................... 349/65 |

\* cited by examiner

*Primary Examiner*—Sandra O'Shea
*Assistant Examiner*—Mark Tsidulko
(74) *Attorney, Agent, or Firm*—Bacon & Thomas, PLLC

(57) ABSTRACT

The present invention relates to a lens-arrayed backlight module, consisting of a housing, a plurality of lamps, and a plurality of lens plates. The lamps are disposed in parallel between the housing and the lens plates to provide illuminating rays. The lens plates correspond to the lamps respectively, each of which being mounted at the center axis of the corresponding lens plate so that the illuminating rays provided by the lamps diffuse through the lens plates. The present invention also provides a liquid crystal display device using the lens-arrayed backlight module.

9 Claims, 4 Drawing Sheets

LENS-ARRAYED BACKLIGHT MODULE AND LIQUID CRYSTAL DISPLAY DEVICE

BACKGROUND OF THE INVENTION

1. Field of the Invention

The present invention relates to a backlight module of a liquid crystal display, and more particularly to a backlight having a lens array to accelerate light diffusion and to achieve a thin module.

2. Description of Related Art

The liquid crystal display is not self-illuminating and so requires an additional lamp for providing a display function. Thus, the backlight module is one of the key components of the liquid crystal displays. As the size of the display panel increases, the edge-light type backlight module employing only one single lamp fails to satisfy the large-size panel with providing sufficient illumination. In this situation, most of the recent large-size panels adopt the direct-light type backlight module having a plurality of lamps. Some display parameters such as brightness, color and power consumption of the liquid crystal displays rely heavily on the backlight module. The direct-light type backlight module has multiple lamps mounted behind the display panel. Also, a diffuser plate is used so that light rays emitting from the respective lamps are uniformly projected onto the display panel. The quantity of the lamps is subject to the luminosity involved in different sized panels. In most cases, the direct-light type backlight module is adapted to the non-portable products such as desktop liquid crystal monitors and liquid crystal televisions. In particular, the liquid crystal television requires large size, wide view angle and high color saturation, and further requires a higher brightness than the liquid crystal monitor. Hence, more and more lamps are used.

However, the current display panels adopting the direct-light type backlight module cause the maximum brightness to occur directly above the lamps, resulting in non-uniform luminosity emitting from the backlight module, that is, dark and faded stripe problem. In general, the dark and faded stripe problem is solved by increasing the space between the lamp and the diffuser plate. This, however, increases the thickness of the backlight module, and does not conform to the current trend for a thin-type display panel. Accordingly, there is a strong need for the direct-light type backlight module to provide an improved module capable of speedily and uniformly diffusing light rays emitted from the lamps within a confined space. As shown in FIG. 1, U.S. patent application Ser. No. 10/330,593, entitled "Direct-lighting Type Backlight Unit", discloses a prior art multiple concave lenses 110 disposed on a diffuser plate 100 to speedily diffuse illuminating rays 121 from lamps 120 corresponding to the concave lenses 110 and to achieve an reduced thickness of the backlight module. However, each of the lamps 120 has to be precisely aligned with the center axis of the corresponding concave lens 110 to obtain uniform light distribution, and no disclosure is provided as to how the multiple lamps 120 are precisely aligned with the center axis of the corresponding concave lenses 110. In addition, since the market requirement of liquid crystal displays is towards being larger and larger, fabrication of a single large-size diffuser plate having a plurality of concave lenses 110 after injection molding will cause a shrinkage problem. Shrinkage of the large-size diffuser plate will cause remarkable changes in the dimensions of the plate and misalignment of the lamps 120 respectively with the center axis of the concave lenses 110. Hence, it is not easy to fabricate a single large-size diffuser plate having multiple concave lenses aligned with the corresponding lamps and stable quality. In practice, it is necessary to adjust the modes for fabrication, accompanied by complex processes and labor-intensive operations. Even so, the uniform illumination effect is rarely achieved.

Therefore, it is desirable to provide an improved lens-arrayed backlight module and liquid crystal display device to mitigate and/or obviate the aforementioned problems.

SUMMARY OF THE INVENTION

A primary object of the present invention is to provide a lens-arrayed backlight module so that each of a plurality of light sources is able to be precisely assembled to the center axis of the corresponding diffusion lens to resolve the shrinkage problem of the diffusion lenses and provide uniform light illumination.

Another object of the present invention is to provide a liquid crystal device so as to improve the dark and faded stripe problem that occurs in the display panels and to provide a thin-profile liquid crystal device having uniform light illumination.

To attain the aforesaid objects, a lens-arrayed backlight module according to the present invention comprises a housing having a plurality of long positioning walls and a plurality of lateral positioning walls; a plurality of light sources disposed in parallel within the housing to provide illuminating rays, each of the light sources including a plurality of lateral positioning sidewalls; and a plurality of lens plates corresponding to the light sources respectively, each of the lens plates including at least two long sidewalls; wherein the lens plates are disposed in parallel on a side of the housing opposite to the light sources, the light sources are mounted on the center axis of the corresponding lens plates respectively so that the illuminating rays provided by the light sources diffuse through the lens plates, the long positioning walls of the housing correspond to the long sidewalls of the lens plates and the lateral positioning sidewalls of the housing correspond to the lateral positioning sidewalls of the light sources so as to position the center axis of the lens plates with respect to the light sources.

To attain the aforesaid objects, a liquid crystal display device according to the present invention comprises a housing; a plurality of light sources disposed in parallel within the housing to provide illuminating rays; and a plurality of lens plates corresponding to the light sources respectively; wherein the lens plates are disposed in parallel on a side of the housing opposite to the light sources, and the light sources are mounted on the center axis of the corresponding lens plates respectively so that the illuminating rays provided by the light sources diffuse through the lens plates.

The light source used in a lens-arrayed backlight module according to the present invention is not specifically defined. Preferably, the light sources is cold cathode florescent lamp (CCFL). The lens plate used in a lens-arrayed backlight module according to the present invention can be any traditional lens assembly capable of diffusing light rays. Preferably, the lens plate is a concave lens assembly or a pair of prisms. Each of the light sources used in a lens-arrayed backlight module according to the present invention has to be precisely mounted at the center axis of the corresponding lens plate so as to diffuse illuminating rays provided by the plurality of light sources. The light sources can be positioned in any traditionally known manner. Preferably, each of the lens plates has at least a first positioning component while each of the light sources has at least a second positioning component for connection to the first positioning component, whereby the plurality of light sources are fixed to the center axis of the lens plates corresponding to the light sources respectively. More preferably, the first positioning component is a protrusion while the second positioning component is a recess capable of engaging with the said protrusion. Alternatively, in a preferred case, the housing has at least a third positioning component and at least a fourth positioning component; each of the lens plates has at least a fifth positioning component for connecting to the third positioning component to fix the relative position of the housing to the lens plates; and each of the light sources has at least a sixth positioning component for connecting to the fourth positioning component to fix the relative position of the housing to the plurality of light sources. As such, the light sources are indirectly fixed at the center axis of the lens plates respectively. More preferably, the third positioning component is a long positioning wall on the housing for engaging with the lens plates, the fourth positioning component is a short positioning wall on the housing for fixedly clamping the light sources, the fifth positioning component is a long edge wall for engaging with the lens plate between the long positioning walls, and the sixth positioning component is a holder for clamping the light sources at the both ends of the light source.

Other objects, advantages, and novel features of the invention will become more apparent from the following detailed description when taken in conjunction with the accompanying drawings.

DETAILED DESCRIPTION OF THE PREFERRED EMBODIMENT

Preferred embodiments of the lens-arrayed backlight module and the liquid crystal display device will be described with reference to the accompanying drawings for illustrating the present invention.

Embodiment 1

Figure 1:
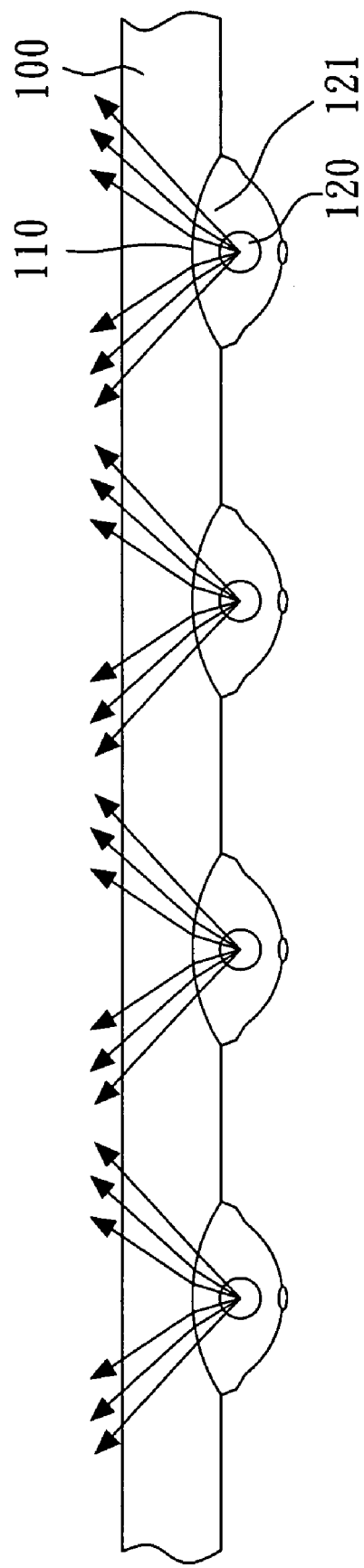
FIG. 1 is a cross-sectional view of a conventional backlight module.
Figure 2:
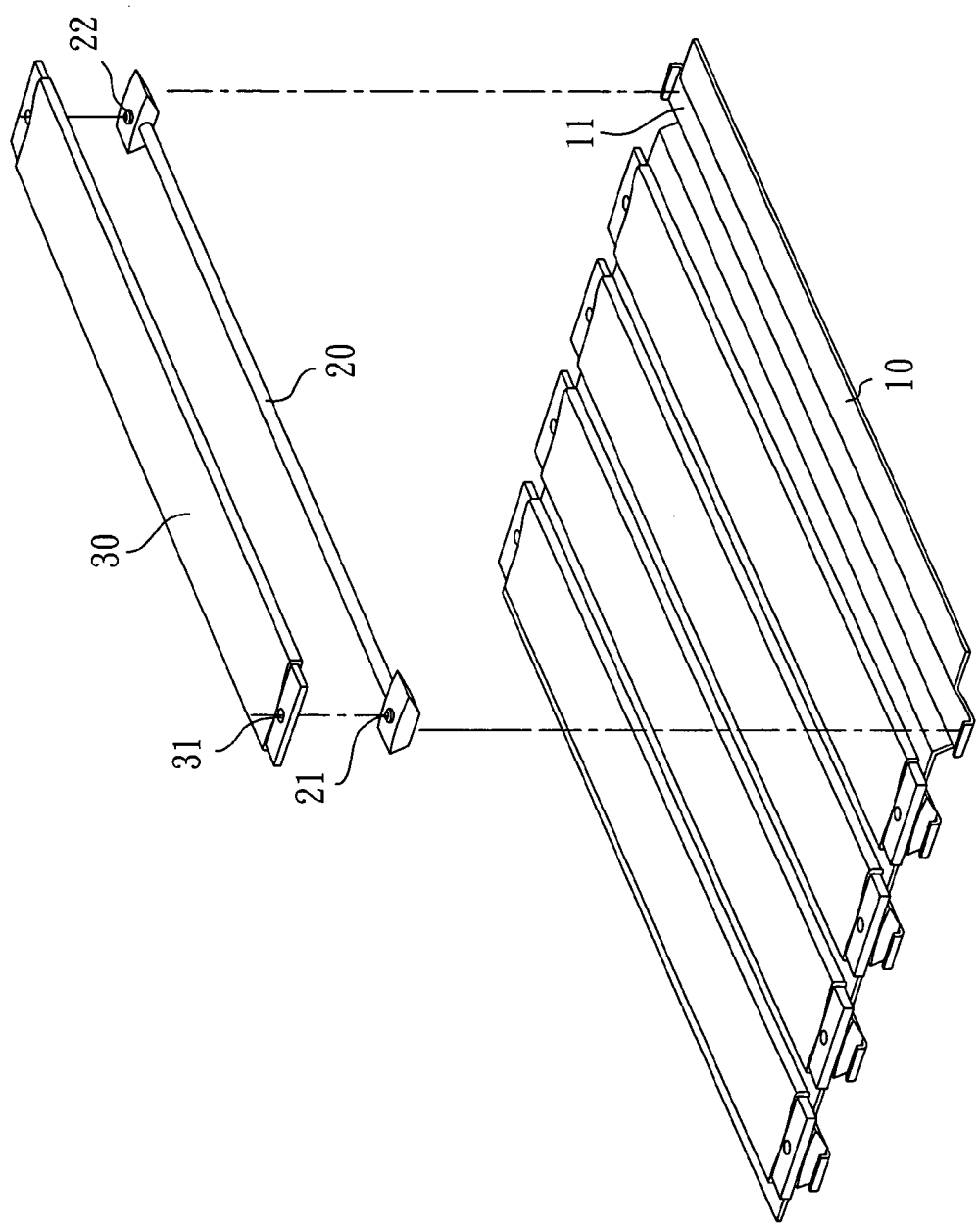
FIG. 2 is a perspective view of a lens-arrayed backlight module according to a preferred embodiment of the present invention.

Referring to FIG. 2, a perspective view of a lens-arrayed backlight module according to a preferred embodiment of the present invention is shown. The lens-arrayed backlight module of the present invention comprises a housing 10, a plurality of lamps 20 and a plurality of lens plates 30. The housing 10 is used for receiving the lamps 20 and the lens plates 30. In this preferred embodiment, the lamps 20 are preferable cold cathode florescent lamps (CCFLs) and disposed in parallel within the housing 10 and mounted between the housing 10 and the lens plates 30 to provide illuminating rays. Each of the lens plates 30 corresponds to one of the lamps 20. In this preferred embodiment, the lens plate 30 is preferable long concave lens plate. Also, each of the lamps 20 is mounted at the center axis of the corresponding lens plate 30 so that illuminating rays provided by the lamps 20 diffuse through the lens plates 30 to avoid dark and faded stripes forming on the display panel as a result of the rays concentrically projecting onto the area of the liquid crystal display panel directly above the lamps 20. In this preferred embodiment, each of the lens plates 30 has a through hole 31 at the both ends thereof. In addition, the lamp 20 has a holder 22 snugly received in a recess 11 of the housing 10 at the both ends thereof so that the lamps 20 are respectively disposed inside the housing 10. The holder 22 has a protrusion 21 extending into the through hole 31 so that the lens plate 30 is assembled on the lamp 20 by connecting the protrusion 21 to the through holes 31. Also, the relative position of the lamps 20 to the lens plates 30 is fixed so that each of the lamps 20 can be easily disposed at the center axis of each of the lens plates 30. Alternatively, the through hole 31 and the protrusion 21 are formed vice-versa, that is, the through hole 31 is defined in the holder 22 while two protrusions 21 are respectively disposed at two ends of the lens plate 30 so that the relative position of the lamps 20 to the lens plates 30 is still fixed.

Embodiment 2

Figure 3:
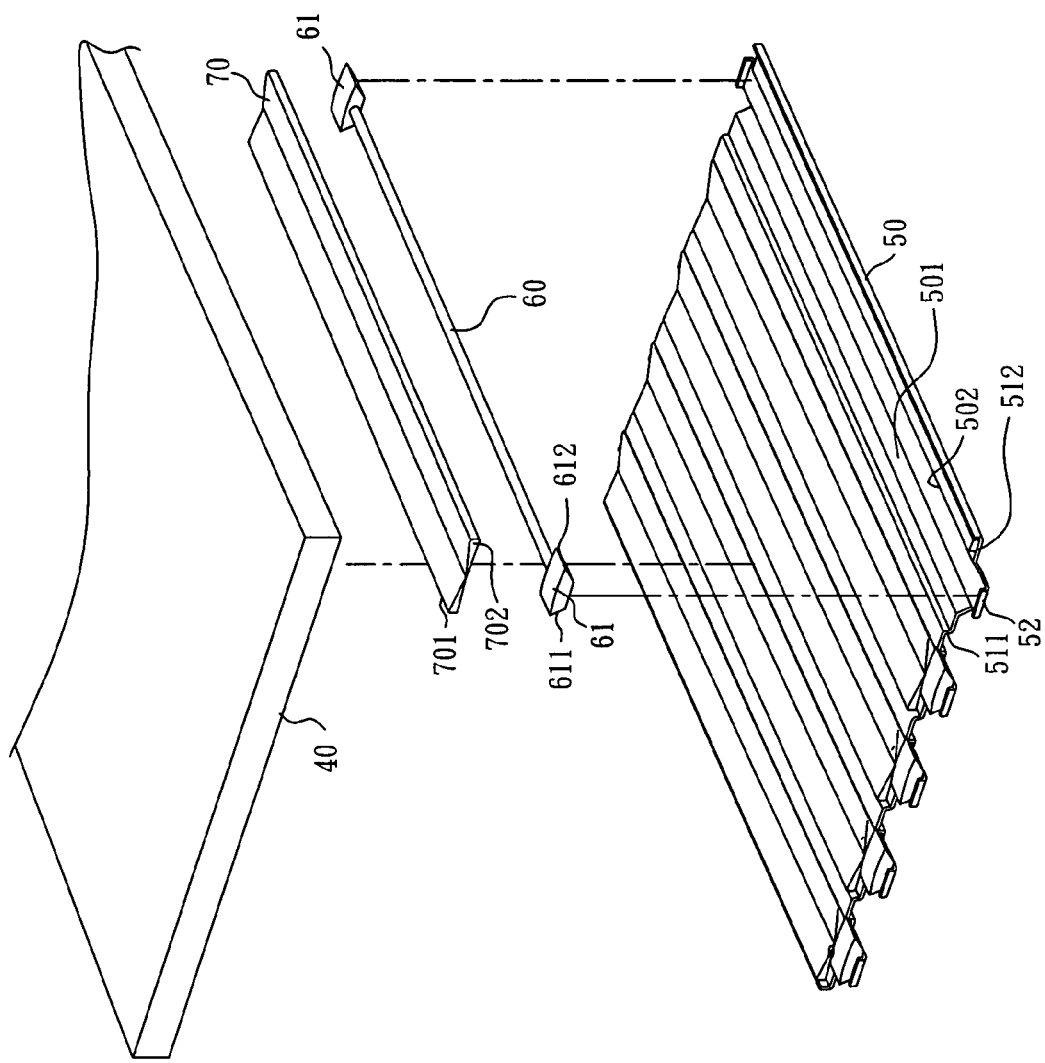
FIG. 3 is a perspective view of a liquid crystal display device according to a preferred embodiment of the present invention.

Referring to FIG. 3, a perspective view of a liquid crystal display device according to a preferred embodiment of the present invention is shown. The liquid crystal display device comprises a liquid crystal display panel 40, a housing 50, a plurality of lamps 60 and a plurality of lens plates 70. The housing 50 is used for receiving the liquid crystal display panel 40, the lamps 60 and the lens plates 70. In this preferred embodiment, the lamps 60 are preferable cold cathode florescent lamps (CCFLs) disposed in parallel within the housing 50 and mounted between the housing 50 and the lens plates 70 to provide the liquid crystal display panel 40 with illuminating rays. Each of the lens plates 70 corresponds to one of the lamps 60. In this preferred embodiment, the lens plate 70 is preferable a pair of prisms. Also, each of the lamps 60 is mounted at the center axis of the corresponding lens plate 70 so that illuminating rays provided by the lamps 60 diffuse through the lens plates 70 to avoid dark and faded stripes from forming on the display panel as a result of the rays concentrically projecting onto the area of the liquid crystal display panel directly above the lamps. In this preferred embodiment, each of the lens plates 70 comprises two long sidewalls 701, 702. The housing 50 has two positioning walls 511, 512 for securely receiving the lens plate 70 in a fixed manner and a short positioning wall 52 for fixedly clamping the lamp 60. Also, the housing 50 has two lateral positioning walls 501, 502 corresponding to lateral positioning walls 611, 612 of the lamp 60 respectively. The relative position of the lamps 60 to the lens plates 70 is indirectly fixed by fixing the relative position of the housing 50 to the lamps 60, the relative position of the housing 50 to the lens plates 70 and the lateral positioning walls 611, 612 of the lamps and the lateral positioning walls 501, 502 of the housing, whereby each of the lamps 60 can be easily disposed at the center axis of each of the lens plates 70.

Embodiment 3

Figure 4:
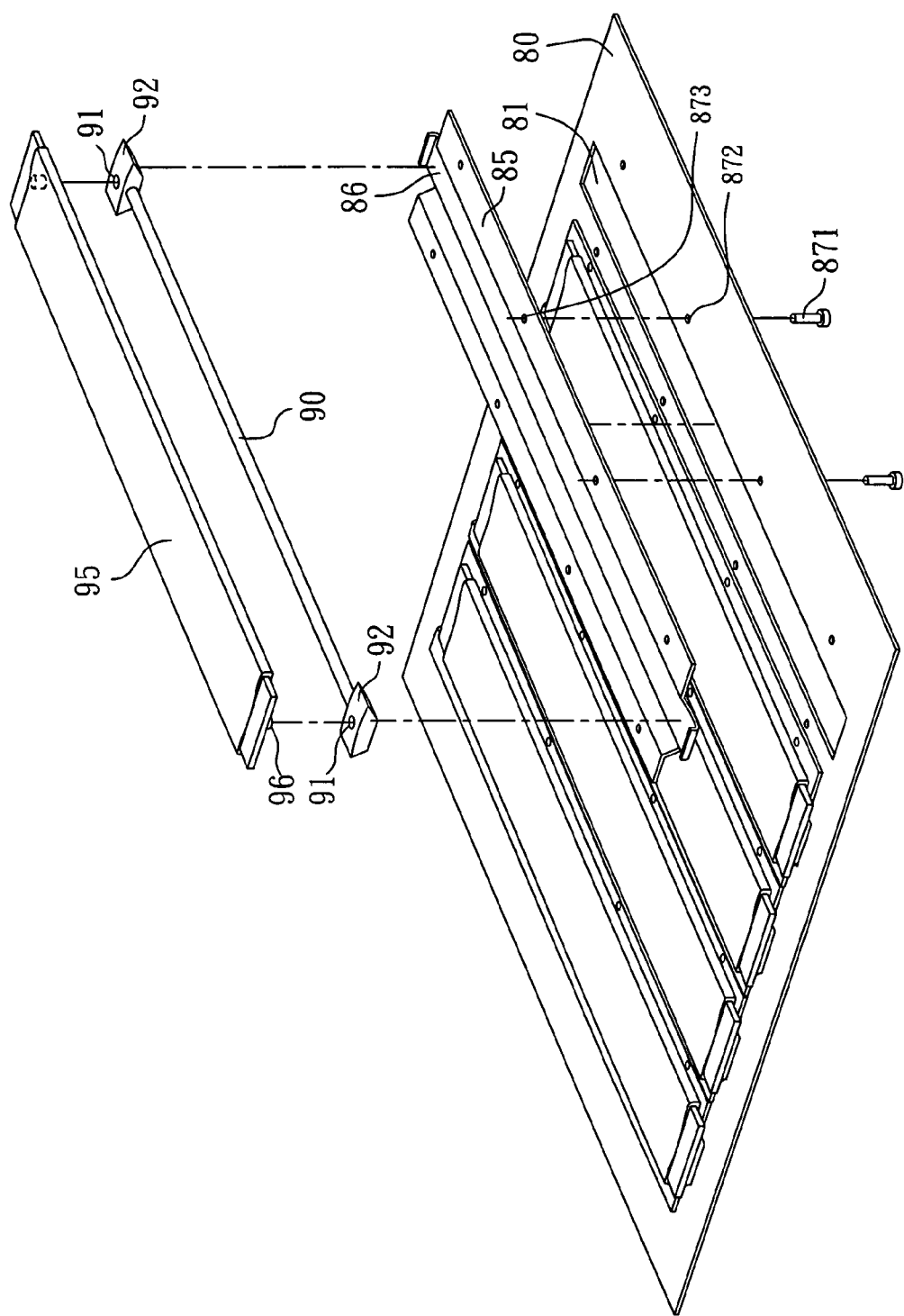
FIG. 4 is a perspective view of a lens-arrayed backlight module according to another preferred embodiment of the present invention.

Referring now to FIG. 4, a perspective view of a lens-arrayed backlight module according to another preferred embodiment of the present invention is shown. To simplify complication of the manufacture, a house is preferably to be composition with one large house and a plurality of small houses. Therefore, the lens-arrayed backlight module of the present invention comprises a large housing 80, a plurality of small housings 85, a plurality of lamps 90 and a plurality of lens plates 95. The large housing 80 has a plurality of elongated openings 81 for fixedly receiving the small housings 85. Each small housing 85 is used for receiving a respective lamp 90 and lens plate 95. In this preferred embodiment, the lamps 90 are preferable cold cathode florescent lamps (CCFLs) mounted between the small housings 85 and the lens plates 95 to provide illuminating rays. In this preferred embodiment, the lens plates 95 are preferable long concave lens plates. Also, each of the lamps 90 is mounted at the center axis of the corresponding lens plate 95 so that illuminating rays provided by the lamps 90 diffuse through the lens plates 95 to avoid dark and faded stripes forming on the display panel as a result of the rays concentrically projecting onto the area of the liquid crystal display panel directly above the lamps 90. In this preferred embodiment, each of the lens plates 95 has a protrusion 96 at the both ends thereof. In addition, the lamp 90 has a holder 92 snugly received in a recess 86 of the small housing 85 at the both ends thereof. The holder 92 has a through hole 91 extending into the protrusion 96 so that the lens plate 95 is assembled on the lamp 90 by connecting the through hole 91 to the protrusion 96. Also, the relative position of the lamps 90 to the lens plates 95 is fixed so that each of the lamps 90 can be easily positioned at the center axis of each of the lens plates 95. Alternatively, the protrusion 96 and the through hole 91 formed vice-versa, that is, the protrusion 96 is defined in the holder 92 while the through hole 91 is disposed at the both ends of the lens plate 95 so that the relative position of the lamps 90 to the lens plates 95 is still fixed.

Moreover, multiple thread holes 872, 873 are defined in the large housing 80 and the small housings 85, respectively. Multiple bolts 871 are used to secure the plurality of small housings 85 onto the large housing 80.

The direct-light type backlight module of the present invention divides the prior single large diffuser plate having a plurality of lenses into a quantity of smaller lens plates for assembly. Thus, the shrinkage rate of the lens plates is reduced so as to revolve the significant shrinkage problem as associated with the known large diffuser plate in injection molding, as well as reducing cost for the diffuser plate mold. In addition, in assembling the direct-light type backlight module of the present invention, the center of the lamp can be easily aligned with the center axis of the lens plate so as to achieve better diffusion efficiency. This invention is capable of uniformly diffusing illuminating rays within a short distance, revolving the dark and faded stripes formed on the display panel and providing a thin-type liquid crystal display device having uniform brightness.

Although the present invention has been explained in relation to its preferred embodiments, it is to be understood that many other possible modifications and variations can be made without departing from the spirit and scope of the invention as hereinafter claimed.

What is claimed is:

1. A lens-arrayed backlight module, comprising:
   a housing;
   a plurality of light sources disposed in parallel within the housing to provide illuminating rays, each of the light sources including a plurality of light source lateral positioning sidewalls; and
   a plurality of lens plates disposed in parallel within the housing, not only opposite to but also corresponding to the light sources respectively, the light sources corresponding to the center axis of length of the lens plates respectively so that the illuminating rays provided by the light sources diffused through the lens plates, and each of the lens plates including at least two long sidewalls,
   wherein the housing includes a plurality of long positioning walls and plurality of housing lateral positioning sidewalls, the long positioning walls correspond to the long sidewalls and the housing lateral positioning sidewalls correspond to the light source lateral positioning sidewalls so as to position the center axis of the lens plates with respect to the light sources.

2. The lens-arrayed backlight module of claim 1, wherein the light sources are cold cathode florescent lamps (CCFLs).

3. The lens-arrayed backlight module of claim 1, wherein each of the lens plates is a concave lens.

4. The lens-arrayed backlight module of claim 1, wherein each of the lens plates is a pair of prisms.

5. The lens-arrayed backlight module of claim 1, wherein the light source lateral positioning sidewalls are engaged with the housing lateral positioning sidewalls.

6. A liquid crystal display comprising:
   a liquid crystal display panel;
   a housing mounted on one side of the liquid crystal display panel;
   a plurality of light sources disposed in parallel between the housing and the liquid crystal display panel to provide the liquid crystal display device with illuminating rays; and
   a plurality of lens plates corresponding to the light source respectively and disposed between the light sources and the liquid crystal display device, the light sources corresponding to the center axis of the lens plates respectively so that the illuminating rays provided by the light sources diffused through the lens plates first and then project onto the liquid crystal display panel;
   wherein the housing has a plurality of long positioning walls and a plurality of lateral positioning walls, the long positioning walls corresponding to a plurality of long sidewalls of the lens plates and the lateral positioning sidewalls corresponding to a plurality of lateral positioning sidewalls of the light sources so as to position the center axis of the lens plates with respect to the light sources.

7. The liquid crystal display device of claim 6, wherein the plurality of light sources are cold cathode florescent lamps (CCFLs).

8. The liquid crystal display device of claim 6, wherein each of the lens plates is a concave lens.

9. The liquid crystal display device of claim 6, wherein each of the lens plates is a pair of prisms.

* * * * *